United States Patent [19]

Ueshiba et al.

[11] Patent Number: 4,685,767
[45] Date of Patent: Aug. 11, 1987

[54] FINE ADJUSTMENT APPARATUS FOR OPTICAL SYSTEM LENS

[75] Inventors: Nozomu Ueshiba, Hirakata; Tetsuji Fukada, Suita; Yukihiko Ise, Toyonaka, all of Japan

[73] Assignee: Matsushita Electric Industrial Co., Ltd., Osaka, Japan

[21] Appl. No.: 703,998

[22] Filed: Feb. 21, 1985

[30] Foreign Application Priority Data

Feb. 27, 1984 [JP] Japan .................................. 59-36566
Nov. 16, 1984 [JP] Japan ................................. 59-242888

[51] Int. Cl.⁴ .......................... G02B 7/04; H02L 41/04
[52] U.S. Cl. ..................................... 350/255; 310/369
[58] Field of Search ............. 350/255; 310/332, 353, 310/369

[56] References Cited

U.S. PATENT DOCUMENTS

| 1,860,529 | 5/1932 | Cady | 310/332 |
|---|---|---|---|
| 2,714,642 | 8/1955 | Kinsley | 310/332 |
| 3,360,664 | 12/1967 | Straube | 310/332 |
| 3,915,560 | 10/1975 | Levine et al. | 350/255 |
| 4,123,136 | 10/1978 | Dahab et al. | 310/332 |
| 4,303,324 | 12/1981 | Marcus | 350/255 |
| 4,383,763 | 5/1983 | Hutchings et al. | 310/332 |

FOREIGN PATENT DOCUMENTS 201237 11/1984 Japan .................................. 350/255

Primary Examiner—William H. Punter
Attorney, Agent, or Firm—Spencer & Frank

[57] ABSTRACT

A fine adjustment apparatus for an optical system lens includes an annular laminated piezoelectric vibrator. The lens is attached to the inner peripheral portion of the piezoelectric vibrator. The piezoelectric vibrator is firmly supported at its outer peripheral portion by a proper member. The piezoelectric vibrator is deflected by the application of a voltage, whereby the lens is finely displaced in the optical axis direction thereof. The piezoelectric vibrator may be formed by laminating two annular piezoelectric elements with an annular metal plate sandwiched therebetween. Each of the piezoelectric elements has the axis of polarization extending in the thicknesswise direction thereof. The metal plate has a thickness which does not exceed at least 25% of the total thickness of the two piezoelectric elements.

6 Claims, 6 Drawing Figures

FINE ADJUSTMENT APPARATUS FOR OPTICAL SYSTEM LENS

BACKGROUND OF THE INVENTION

1. Field of the Invention:

The present invention relates to a structure of an optical system lens fine adjustment apparatus which finely varies the focal length of an optical system lens employed in an optical system precision device or a camera, such as an automatic focusing camera, a video camera and so forth.

2. Description of the Prior Art:

As a means for varying the focal length of a lens, a permanent magnet and a coil are employed to make use of electromagnetic force to displace the lens. This means, however, offers the following disadvantages. The employment of a permanent magnet and a coil unfavorably complicates the structure of the apparatus for carrying out the focal length variation and increases the size thereof as well as results in large variations in conditions among various apparatuses. In addition, with the conventional techniques, it has been difficult to effect fine positioning of the lens.

Another conventional techniques of varying the position of a lens employs a vibrator constituted by a piezoelectric material. In this case, if the vibrator is constituted by a piezoelectric film of, for example, PVF$_2$, it is necessary to firmly secure the outer edge portion of the vibrator for the purpose of preventing the vibrator from being deflected by the weight of the lens, which involves difficulty in aligning optical axes with each other. Further, it is difficult for the vibrator of the type described above to vibrate with a large amplitude. On the other hand, a vibrator of piezoelectric ceramic inconveniently involves difficulty in supporting and securing the same and has the disadvantage that the vibration mode and the displacement amount undesirably change depending upon various conditions including the position at which the vibrator is secured.

SUMMARY OF THE INVENTION

Accordingly, it is a primary object of the present invention to provide a fine adjustment apparatus for an optical system lens, which is capable of stably and easily driving the lens to finely vary the focal length thereof and has high mechanical strength and which has a simple structure which enables the apparatus to be excellently mass-produced and is small in variations in conditions among various apparatuses.

To this end, according to the present invention, there is provided a fine adjustment apparatus for an optical system lens wherein the lens is attached to the inner peripheral portion of an annular laminated piezoelectric vibrator, the outer peripheral portion of the piezoelectric vibrator is firmly supported by a proper member, and a voltage is applied to the piezoelectric vibrator to deflect the same, thereby finely displacing the lens in the optical axis direction thereof.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be described hereinunder with reference to the accompanying drawings.

Figure 1:
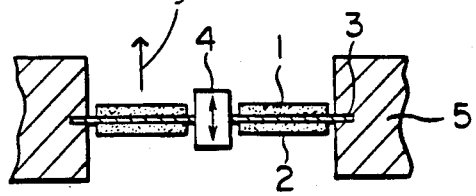
FIGS. 1, 2A, and 4 are sectional views respectively showing embodiments of the optical system lens fine adjustment apparatus according to the present invention.
Figure 2:
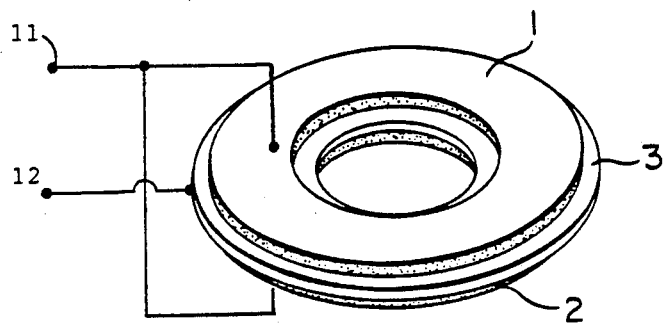
FIG. 2 is a perspective view showing laminated piezoelectric vibrators which may be employed in the apparatus according to the invention.

Referring first to FIGS. 1 and 2, the reference numerals 1, 2 respectively denote annular piezoelectric ceramic plates each having the axis of polarization extending in the thicknesswise direction 9 thereof. Each of plates 1 and 2 has an axis of symmetry which passes through the center of the plate parallel to its axis of polarization, a circular inner periphery having an inner peripheral diameter, a circular outer periphery having an outer peripheral diameter, and axial end surfaces extending between the inner and outer peripheries, normal to the axis of symmetry and constituting electrodes. An annular metal plate 3 has a thickness which does not exceed at least 25% of the total thickness of the two piezoelectric ceramic plates 1, 2 and is larger in diameter than the latter. Plate 3 is planar, has an inner periphery with a diameter smaller than the inner peripheral diameter of each plate 1 and 2, a circular outer periphery with a diameter greater than the outer peripheral diameter of each plate 1 and 2, and upper and lower end surfaces extending between the inner and outer peripheries thereof. The piezoelectric ceramic plates 1, 2 are respectively bonded to both sides of the metal plate 3 by means of a bonding agent, such as an epoxy resin, to thereby form a laminated piezoelectric vibrator.

An optical system lens 4 is fitted in the central bore in the metal plate 3 of the laminated piezoelectric vibrator so as to be bonded to the inner periphery of plate 3. In the state of being received in the central bore, the lens 4 has its outer peripheral portion secured to the metal plate 3 by, for example, a bonding agent.

A circular outer frame 5 of a metal or other material firmly supports the outer peripheral edge of the metal plate 3 near the respective outer peripheral portions of the piezoelectric ceramic plates 1, 2 in such a manner that the frame 5 clamps the upper and lower end surfaces at the outer peripheral edge of the metal plate 3.

The optical system lens fine adjustment apparatus arranged as described above operates as follows. A voltage is applied from terminals 11 and 12 to the annular piezoelectric ceramic plates 1, 2 of the fine adjustment apparatus in such a manner that one of the piezoelectric ceramic plates radially expands and the other radially contracts. Thereupon, the laminated piezoelectric vibrator is deflected, whereby the lens 4 mounted in the central portion of the vibrator is finely displaced in the optical axis direction thereof. When the voltage is applied to the piezoelectric ceramic plates 1, 2 in the direction opposite to the above, the lens 4 is displaced in the direction opposite to the above.

Further, if an AC voltage is applied to the piezoelectric ceramic plates 1, 2, then the lens 4 vibrates in the manner shown by the arrow in FIG. 1, whereby it is possible to periodically change the position of the focal point of the lens 4.

According to the optical system lens fine adjustment apparatus of the present invention, the outer peripheral edge of the laminated piezoelectric vibrator is firmly supported by the circular outer frame 5. It is, therefore, possible to obtain stable vibrational characteristics by virtue of the excellent symmetry of the circular outer frame 5. Accordingly, it is possible to obtain a high degree of accuracy in positioning the lens 4 by means of displacement and to allow the lens to be displaced by a large amount.

Further, according to this embodiment, the piezoelectric ceramic plates 1, 2 are indirectly secured to the outer frame 5 through the metal plate 3 which is firmly supported by the frame 5. For this reason, the fine adjustment apparatus is favorably increased in the mechanical strength, so that there is not fear of destruction of the piezoelectric ceramic plates 1, 2 at the time when the lens 4 is finely displaced or in the case where a laminated piezoelectric vibrator is attached to the outer frame 5. Thus, the fine adjustment apparatus according to the present invention has excellent impact resistance and operability and a simple structure which allows the apparatus to be excellently mass-produced.

Figure 2A:
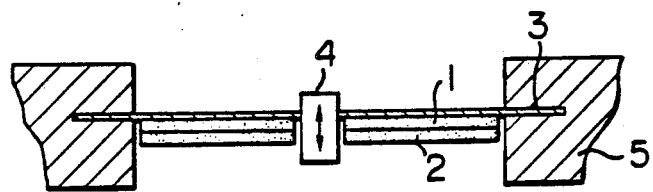

In the above-described embodiment, the lens is finely displaced by the laminated piezoelectric vibrator which is formed by laminating the piezoelectric ceramic plates one upon the other in such a manner that their respective axes of polarization extend in the same direction and connecting them electrically in parallel. The present invention is, however, not necessarily limited to this arrangement. For example, the piezoelectric vibrator may be formed by laminating the piezoelectric ceramic plates with their respective axes of polarization aligned but in opposite directions and connecting them electrically in series. Further, it is not always necessary to laminate two piezoelectric ceramic plates with a metal plate sandwiched therebetween. Advantageous effects similar to those described above can be achieved with a structure as shown in FIG. 2A in which the two piezoelectric ceramic plates 1 and 2 are laminated one upon the other and the metal plate is laminated on one end surface of the laminated piezoelectric ceramic plates. Furthermore, it is also possible to fulfill the present invention with a metal plate which has a shape other than an annular shape.

Figure 3:
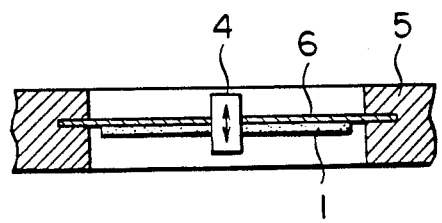
Figure 4:
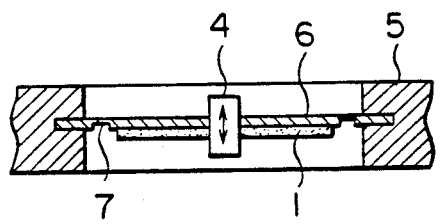

Moreover, it is possible to obtain advantageous effects similar to those described above by an optical system lens fine adjustment apparatus, such as that shown in FIG. 3. This apparatus includes a laminated piezoelectric vibrator which is formed by laminating on the piezoelectric ceramic plate 1 a metal plate 6 having a thickness substantially equal to that of the ceramic plate 1. To further increase the maximum amount of fine movement of the lens 4, it is only necessary to provide a concentric groove 7 on the metal plate 6 in the manner shown in FIG. 4.

Figure 5:
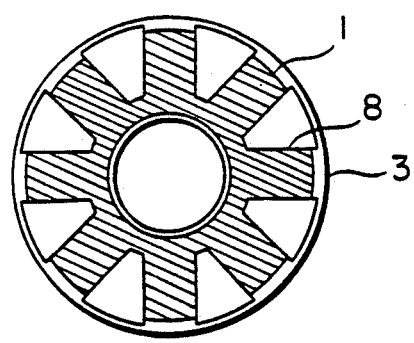
FIG. 5 is a plan view showing laminated piezoelectric vibrators which may be employed in the apparatus according to the invention.

It is to be noted that, if such a structure is employed has having at least two cantilevers 8, by notching each plate 1, 2 and 3 as shown in FIG. 5, then, although the structure becomes complicated, the area of the piezoelectric ceramic plates required to form the piezoelectric vibrator is favorably reduced as compared with the annular piezoelectric ceramic plates 1, 2 shown in FIG. 1. Accordingly, the electrical capacitance is reduced by an amount corresponding to the reduced area, thus advantageously allowing a reduction in the electric power consumed when the lens is finely adjusted.

As has been described above, according to the present invention, the following advantageous effects are offered:

(1) It is possible to provide a fine adjustment apparatus for an optical system lens which has a simple structure and is small in the size and the thickness.

(2) Since its structure is simple, the apparatus can be excellently mass-produced.

(3) The apparatus has a high degree of accuracy in positioning a lens by means of displacement.

Although the invention has been described through specific terms, it is to be noted here that the described embodiments are not exclusive and various changes and modifications may be imparted thereto without departing from the scope of the invention which is limited solely by the appended claims.

What is claimed is:

1. A fine adjustment apparatus for an optical system lens, comprising:

at least one annular piezoelectric vibrator element having an axis of symmetry, a thickness dimension parallel to the axis of symmetry, a circular inner periphery having an inner peripheral diameter, a circular outer periphery having an outer peripheral diameter, and axial end surfaces extending between said inner and outer peripheries and normal to the axis of symmetry and constituting electrodes, said vibrator element having an axis of polarization extending parallel to the axis of symmetry;

an annular, planar thin metal plate to which said vibrator element is laminated along said inner and outer peripheries of said vibrator element, said plate having an inner periphery with a diameter smaller than the inner peripheral diameter of said vibrator element, a circular outer periphery with a diameter greater than the outer peripheral diameter of said vibrator element, and upper and lower end surfaces extending between the inner and outer peripheries thereof, said inner periphery of said plate being bonded to the lens system; and a support member to which said upper and lower end surfaces at the outer periphery of said plate are fixed at a location spaced from said outer periphery of said vibrator element.

2. A fine adjustment apparatus for an optical system lens according to claim 1, wherein there are two said piezoelectric elements integrally laminated together, and said metal plate is bonded to one end surface of the laminated piezoelectric elements.

3. A fine adjustment apparatus according to claim 1 wherein there are two said annular piezoelectric vibrator elements, with said plate being sandwiched between, and bonded to, said two vibrator elements.

4. A fine adjustment apparatus for an optical system lens according to claim 3, wherein each of said piezoelectric elements has at least two cantilevers formed by notching a portion thereof, and said metal plate having the same configuration as that of said piezoelectric elements formed with said cantilevers.

5. A fine adjustment apparatus for an optical system lens according to claim 1, wherein there is only one said piezoelectric vibrator element and said vibrator element has a thickness substantially equal to that of said plate.

6. A fine adjustment apparatus for an optical system lens according to claim 5, wherein said annular metal plate is provided with a groove.

* * * * *